United States Patent [19]

Tonn

[11] 3,996,650
[45] Dec. 14, 1976

[54] FILM RETAINER MEMBER FOR SOLAR HEATER CHAMBER

[76] Inventor: Martin H. Tonn, Box 39, Amboy, Minn. 56010

[22] Filed: Sept. 29, 1975

[21] Appl. No.: 617,956

[52] U.S. Cl. .................... 24/249 LS; 52/2
[51] Int. Cl.² ............... A44B 21/00; F24J 3/02
[58] Field of Search ........... 24/249, 243 K, 73 CF, 24/81 CC, 81 BA, 248 S, 248 SF, 243 SP, 243 SF, 249 LS, 248 BA, 249 PC; 135/15 CF, 15 R, 3 R; 52/2; 248/62

[56] References Cited

UNITED STATES PATENTS

| | | | |
|---|---|---|---|
| 303,332 | 8/1884 | Snell | 24/243 N UX |
| 576,769 | 2/1897 | Williams | 24/249 LS |
| 701,126 | 5/1902 | Bahrmann | 135/15 CF |
| 1,183,819 | 5/1916 | Keiser | 24/243 K |
| 1,300,482 | 4/1919 | Petranich | 24/243 N X |
| 1,367,426 | 2/1921 | Penwell et al. | 24/249 PC X |
| 2,222,289 | 11/1940 | Fordon | 24/249 PC |
| 2,370,748 | 3/1945 | O'Donnell | 24/249 LS |
| 2,419,393 | 4/1947 | Doyle | 24/248 SA UX |
| 2,473,217 | 6/1949 | Peoples | 24/249 LS |
| 2,975,904 | 3/1961 | Krebs et al. | 24/249 SL |
| 3,474,804 | 10/1969 | Gellert | 135/3 R X |
| 3,500,593 | 3/1970 | Kwake | 52/2 |
| 3,661,693 | 5/1972 | Pierson | 52/2 X |
| 3,816,885 | 6/1974 | Saether | 24/243 K |
| 3,908,631 | 9/1975 | Rom | 52/2 X |

FOREIGN PATENTS OR APPLICATIONS 385,548 3/1965 Switzerland ............. 24/243 K

*Primary Examiner*—Donald A. Griffin
*Attorney, Agent, or Firm*—Orrin M. Haugen

[57] ABSTRACT

A clamping bracket means for use with lateral and vertical film supporting rails for defining a film enclosure of finite length, and having a facility for quick-connect and quick-disconnect action. The clamping bracket means includes a pair of opposed brackets arranged to be retained together to form a clamping jaw, with the jaw portion being fitted with a split sleeve of resilient material for enclosing and grippingly retaining a flexible film member upon a film supporting rail, with the split sleeve extending beyond the edges of the jaw.

2 Claims, 4 Drawing Figures

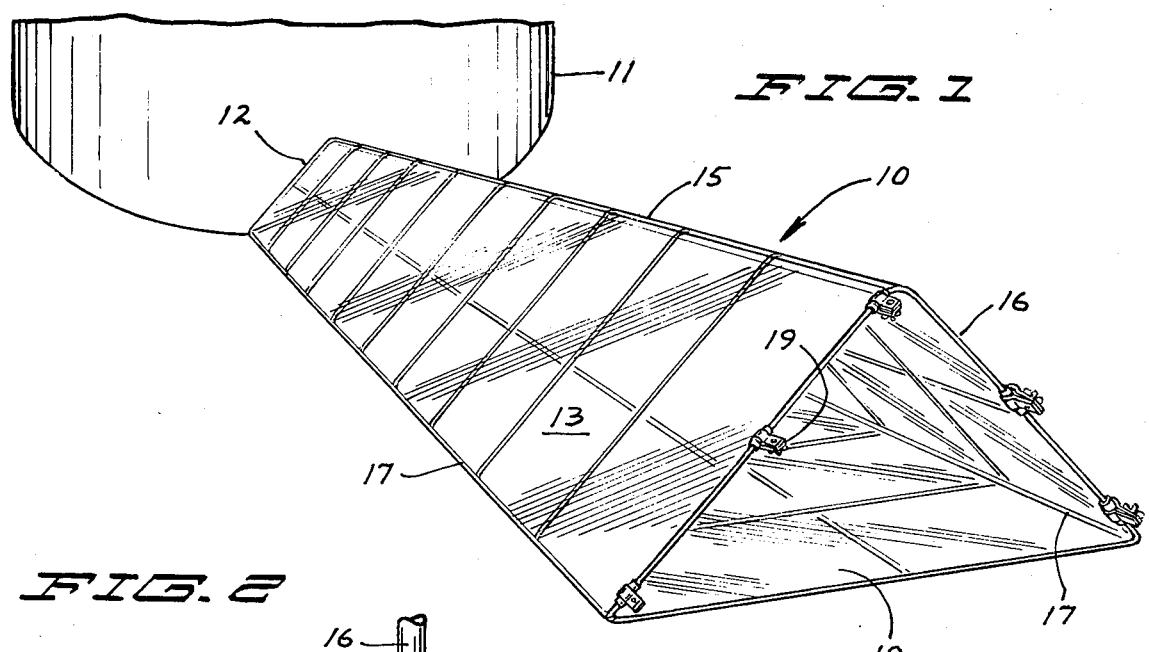
FIG. 1
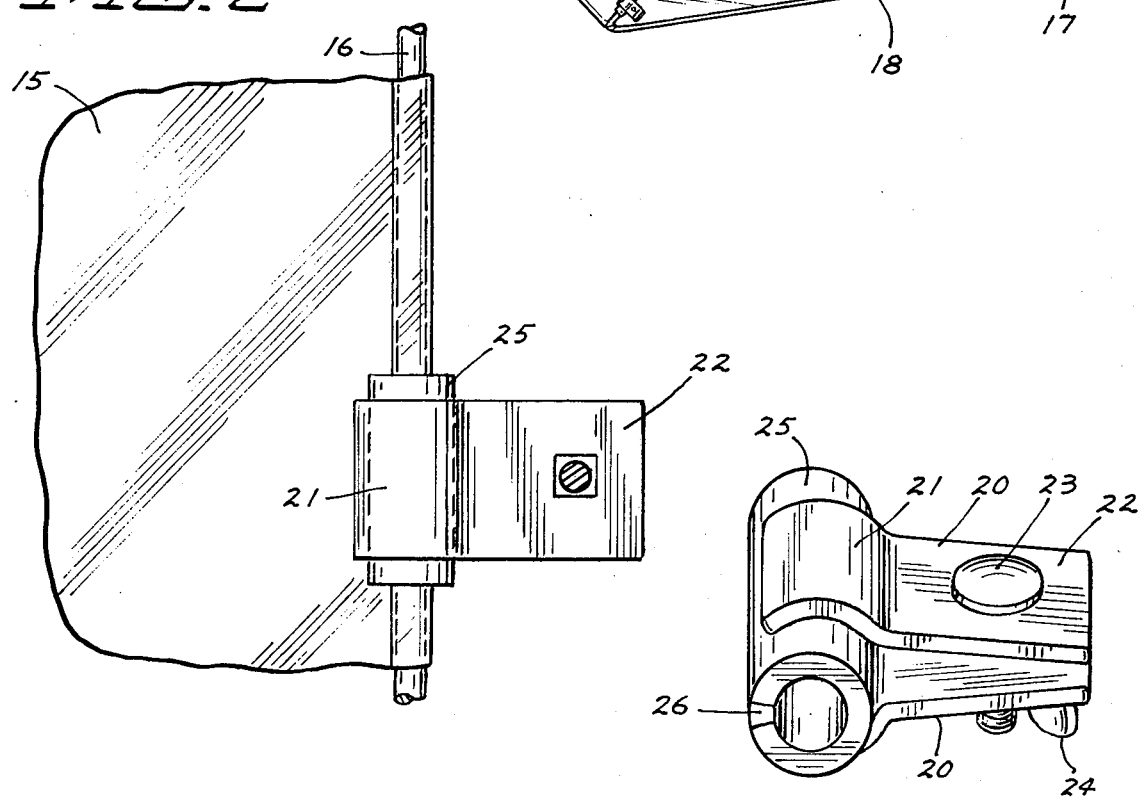
FIG. 2
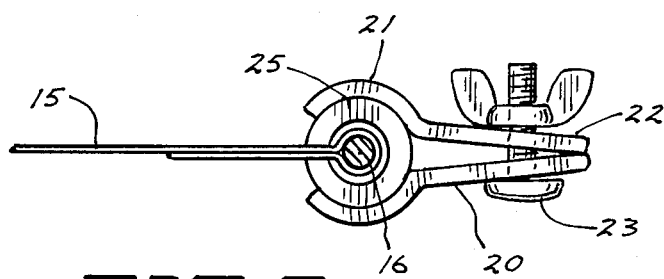
FIG. 3
FIG. 4

FILM RETAINER MEMBER FOR SOLAR HEATER CHAMBER

BACKGROUND OF THE INVENTION

The present invention relates generally to an improved clamping bracket means for use with flexible film supporting systems, and specifically for a quick-connect and quick-disconnect clamping bracket means which is useful in mounting and retaining a flexible film member upon support rails for defining a film enclosure. The film enclosure has particular utility in green drying or crop drying operations, wherein the flexible film system is adapted to obtain energy from the sun, preheat air within the film enclosure, and ultimately deliver the air to a grain drying enclosure.

The clamping bracket means of the present invention has particular utility in combination with that system disclosed in my copending application, Ser. No. 427,146 filed Dec. 21, 1973, and entitled "Solar Pre-Heat Chamber for Grain Dryers". This system illustrates a grain drying enclosure having an inlet thereto fed with air at least partially heated in the solar heating chamber in combination therewith. The system of the present invention has, as indicated, utility and other systems as well, but is particularly useful in connection with such an overall system arrangement.

Briefly, in accordance with the present invention, the clamping bracket means includes a pair of opposed brackets arranged to be retained together to form a clamping jaw, with each clamping bracket comprising a shank portion and a jaw portion, and with the shank portion being arranged to accommodate a carriage bolt to retain the members in proper disposition. The clamping jaw portions each have a generally semicircular outer zone defining a cylindrical jaw therebetween, and a split sleeve element is arranged to be retained within the cylindrical jaw so as to enclose and grippingly retain a flexible film member on a film supporting rail.

Therefore, it is the primary object of the present invention to provide a new and improved clamping bracket means which is particularly adapted for use with lateral and vertical flexible film supporting rails for releasable securing a film enclosure of finite length to support rails for defining a solar energy heating chamber therewithin.

It is yet a further object of the present invention to provide an improved clamping bracket means for use with flexible film, and specifically to provide releasable gripping engagement between a flexible film product and the lateral and vertical or substantially vertical supporting rails used in combination therewith so as to define a solar energy heating chamber.

It is yet a further object of the present invention to provide an improved clamping bracket means which is adapted for reasonably retaining and grippingly engaging a flexible film material unto laterally and generally vertically disposed supporting rails in order to define a film enclosure of finite length, the enclosure having one opened to atmosphere, and with the other end being coupled to the inlet of a grain crop drying chamber.

Other and further objects of the present invention will become apparent to those skilled in the art upon a study of the following specifications, appended Claims, and accompanying drawing.

DRAWING

FIG. 1 is a perspective view of a solar heating chamber adapted for use in combination with a grain dryer, and illustrating the open end of the solar heating chamber with a number of clamping brackets of the present invention are being secured so as to grippingly engage the flexible film forming the heating chamber therewithin;

FIG. 2 is a detail plan view, partially broken away, and on a slightly enlarged scale, and illustrating one of the clamping brackets of the present invention as shown in FIG. 1, but with the securing nut removed;

FIG. 3 is a vertical sectional view of that portion of the assembly illustrated in FIG. 2, and illustrating the arrangement with the nut secured thereto; and FIG. 4 is a perspective view, on the scale of Figures 2 and 3, and illustrating the opposed surface of the clamping bracket, and with the bracket partially opened, and with the film removed from the jaws thereof.

DESCRIPTION OF THE PREFERRED EMBODIMENT

In accordance with the preferred embodiment, and with particular attention being directed to FIG. 1 of the drawing, the solar pre-heat chamber generally designated 10 is shown coupled to a grain drying bin 11, with the coupling being located as at 12. As previously indicated, the system of the present invention is shown in detail in copending application Ser. No. 427,146, Filed Dec. 21, 1973, and entitled "Solar Pre-Heat Chamber for Grain Dryers". For purposes of FIG. 1, however, the chamber generally designated 13 is fabricated from a film of polyethylene or the like, such as the film 15, with film 15 having side walls such as depending side wall 16 meeting with a base rail or the like as at 17, and thereby intersecting a base film member which extends across or spans lateral base rail 17—17. The opening to this chamber is at 18, this opening being available to atmosphere of course.

The individual brackets are shown generally at 19—19, in assembled form, and are, as indicated, used to hold and retain the film layer 15 about the individual generally vertical or upright rail 16—16.

With attention now being directed to FIGS. 2, 3 and 4 of the drawing, it will be seen that the clamping bracket generally designated 19 includes a pair of opposed bracket members 20—20 arranged to be retained together to form a clamping jaw as at 22, and a jaw portion, as indicated at 21, and a carriage bolt with its square shank portion adjacent the head thereof is passed through the opening formed in shank portion 20, with the threaded end portion receiving the wing nut 24. As is apparent in FIG. 2, the bore formed in the shank portion 20 is square so as to receive the square shank portion of the carriage bolt 23 therein.

Also, as is apparent in FIG. 4, the clamping jaw portions 21 each have a generally semicircular arcuate zone defining a cylindrical jaw therebetween, and a split sleeve fabricated from a resilient member such as resilient flexible rubber tubing or the like is retained within the cylindrical jaw and arranged to enclose and grippingly retain a flexible film member on the rigid support rail. As is apparent in FIG. 3, the resultant sleeve member 25 substantially encircles the film member on the support rail. Also, it will be noted that the sleeve member extends outwardly from the lateral edges of the clamping jaw, and this extension is generally equivalent in length to the diameter of the sleeve.

In order to set up the system, the chamber 13 is fabricated from a plurality of triangular members with, such as the isosceles triangular members illustrated, and with the right angle apex forming the top or upper portion of the system. The solar pre-heating chamber 13 is coupled to the drying bin 11 as at 12, and fan means (not shown) are normally utilized to induce the flow of air through the arrangement. Such a fan system is, of course, illustrated in copending application, Ser. No. 427,146 described more fully hereinabove. The film such as the film 15 is arranged to cover the support members, as indicated, and thus provide the enclosure required for the chamber. The individual clamping brackets 19—19 are used in combination with the flexible film so as to complete the enclosure and definition of the solar pre-heating chamber.

It will be appreciated, of course, that the clamping bracket means of the present invention are quickly attached or quickly released, thus rendering it possible to assemble the entire system readily and expeditiously. In addition to utilization in solar pre-heating chambers, of course, it will be appreciated that other applications may become apparent to those skilled in the art.

I claim:

1. Clamping bracket means for use with lateral and vertical flexible film supporting rails for defining a film enclosure of finite length and having one end thereof opened to atmosphere and the other end coupled to the inlet of a grain drying chamber and comprising:
   a. a pair of opposed bracket members arranged to be retained together to form a clamping jaw, each bracket member comprising a generally planar shank portion and a jaw portion, each shank portion having a generally square opening formed therein to receive a carriage bolt shank therewithin, and said clamping jaw portions having a generally semicircular arcuate zone terminating along a free end portion and defining a cylindrical jaw of first diameter therebetween;
   b. a carriage bolt retained within said square bore and with nut means grippingly retaining said opposed brackets together with the shank portions in abutting relationship; and
   c. split sleeve means having a second diameter which substantially exceeds said first diameter and being fabricated from a resilient member grippingly retained within said cylindrical jaw and arranged to envelope and substantially enclose a flexible film member about a supporting rail.

2. The clamping bracket means as defined in claim 1 being particularly characterized in that said lateral and vertical flexible film supporting rails are arranged in sides of a substantially isosceles triangle with the right angle apex at the upper portion thereof.

* * * * *